(12) United States Patent
Rhoads et al.

(10) Patent No.: US 6,741,978 B1
(45) Date of Patent: May 25, 2004

(54) ACCESSING FILE DATA STORED IN NON-VOLATILE RE-PROGRAMMABLE SEMICONDUCTOR MEMORIES

(75) Inventors: Edward R. Rhoads, Sherwood, OR (US); James P. Ketrenos, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/547,624

(22) Filed: Apr. 12, 2000

(51) Int. Cl.[7] ............................................... G06F 17/30
(52) U.S. Cl. .......................................... 707/1; 711/202
(58) Field of Search ............................. 707/1, 2, 100, 707/101, 102; 711/202, 3, 101

(56) References Cited

U.S. PATENT DOCUMENTS

| | | | |
|---|---|---|---|
| 5,337,275 A | 8/1994 | Garner | 365/189.01 |
| 5,490,260 A | 2/1996 | Miller et al. | 711/100 |
| 5,586,285 A | 12/1996 | Hasbun et al. | 711/103 |
| 5,592,669 A * | 1/1997 | Robinson et al. | 707/206 |
| 5,694,619 A * | 12/1997 | Konno | 710/68 |
| 5,745,418 A | 4/1998 | Ma et al. | 365/185.33 |
| 5,828,877 A | 10/1998 | Pearce et al. | 709/100 |
| 6,266,753 B1 * | 7/2001 | Hicok et al. | 345/555 |

* cited by examiner

Primary Examiner—Sanjiv Shah
(74) Attorney, Agent, or Firm—Trop, Pruner & Hu, P.C.

(57) ABSTRACT

File data for an operating system may be stored in a compressed format in a re-programmable semiconductor memory. The memory may be provided with a header and data for one or more file systems all stored in a compressed format. A device driver also stored in the memory may be utilized to decompress the data and to convert it to a format suitable for a particular file system or operating system.

30 Claims, 6 Drawing Sheets

ACCESSING FILE DATA STORED IN NON-VOLATILE RE-PROGRAMMABLE SEMICONDUCTOR MEMORIES

BACKGROUND

This invention relates generally to processor-based systems using semiconductor memory as their primary, non-volatile, re-programmable storage medium.

There is increasing interest in so called embedded processor-based systems. These systems often operate with reduced functionalities to provide desired performance at relatively low cost. In many cases, these embedded systems may be battery operated. Thus, their capabilities may be limited to improve battery lifetime.

For a variety of reasons including conserving battery life, reducing cost and providing a compact form factor, processor-based systems may be provided which do not use a hard disk drive as their non-volatile storage medium. In many processor-based system, a hard disk drive provides a convenient non-volatile storage medium that stores most of the information which the user desires to maintain permanently. This may include among other things, the operating system, application software, files and data, as examples. The information that is stored in the hard disk drive may be transferred for execution to system memory which conventionally is a volatile memory.

In many systems, hard disk drives provide a very high capacity, relatively quick storage medium. However, hard disk drives take more space and use more power than non-volatile semiconductor memories. In many embedded systems, re-programmable, non-volatile semiconductor memories are used as a primary storage system for processor-based systems. These semiconductor memories store the panoply of information normally stored in hard disk drives including operating systems.

In many cases, the semiconductor memories utilized as primary non-volatile storage media for processor-based systems are flash memories. These flash memories may be re-programmed without user intervention using well known on-board capabilities. These memories are generally accessed using row and column addresses. Thus, the memories are generally monolithic in that the location of files and other data in that memory is generally stored outside the memory.

Thus, there is a continuing need for a way to enable an operating system to store more information on a non-volatile re-programmable semiconductor memory and to access that information efficiently.

DETAILED DESCRIPTION

Figure 1:
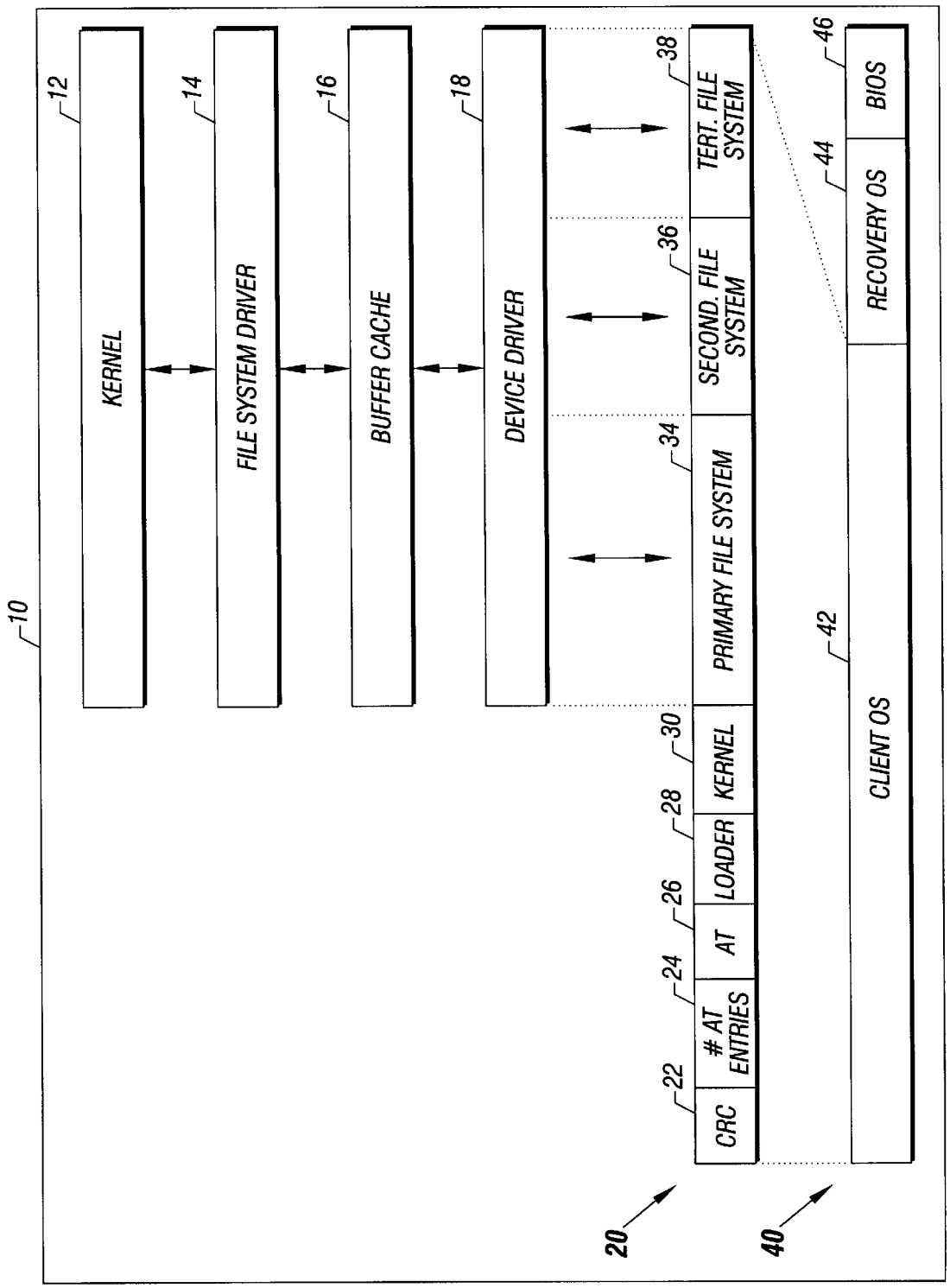
FIG. 1 is a schematic depiction of the software modules utilized in accordance with one embodiment of the present invention.

Referring to FIG. 1, a client processor-based system may include a software architecture 10 having an operating system kernel 12 that communicates with a file system driver 14. The file system driver 14 receives raw data from a semiconductor memory 40 and arranges that data in a logical layout. The driver 14 communicates with a buffer cache 16 which buffers the raw data to enable it to be utilized effectively by the driver 14. The device driver 18 accesses blocks of file data from a non-volatile re-programmable semiconductor memory 40, such as a flash memory, in accordance with one embodiment of the present invention. The device driver 18, which need not have information about the format of the data on the memory 40, organizes the data in a format that is compatible with the file system driver 14.

Thus, the memory 40 may store a client operating system 42 and a recovery operating system 44 which may be accessed if the client operating system fails. It may also store a basic input/output system (BIOS) 46 in accordance with one embodiment of the present invention.

The client operating system 42 may include a cyclic recovery check (CRC) field 22, a field 24 that indicates the number of allocation table entries, a field 26 that includes the allocation table, a field 28 that includes a loader and a field 30 that includes the operating system kernel. The field 30 also includes the drivers 14 and 18.

The client operating system 42 may also have one or more file system data storage areas 34, 36 and 38. These areas 34, 36 and 38 include raw compressed data that may be utilized by the operating system kernel 12.

The device driver 18 may access any of the data areas 34, 36 or 38 upon request from a file system driver 14. Thus, information may be accessed in the compressed format on the semiconductor memory 40 and loaded, in an uncompressed format, into the buffer cache 16 for access by the device driver 14. The device driver 18 decompresses the compressed data in memory 40 and provides it to the buffer cache 16.

Figure 2:
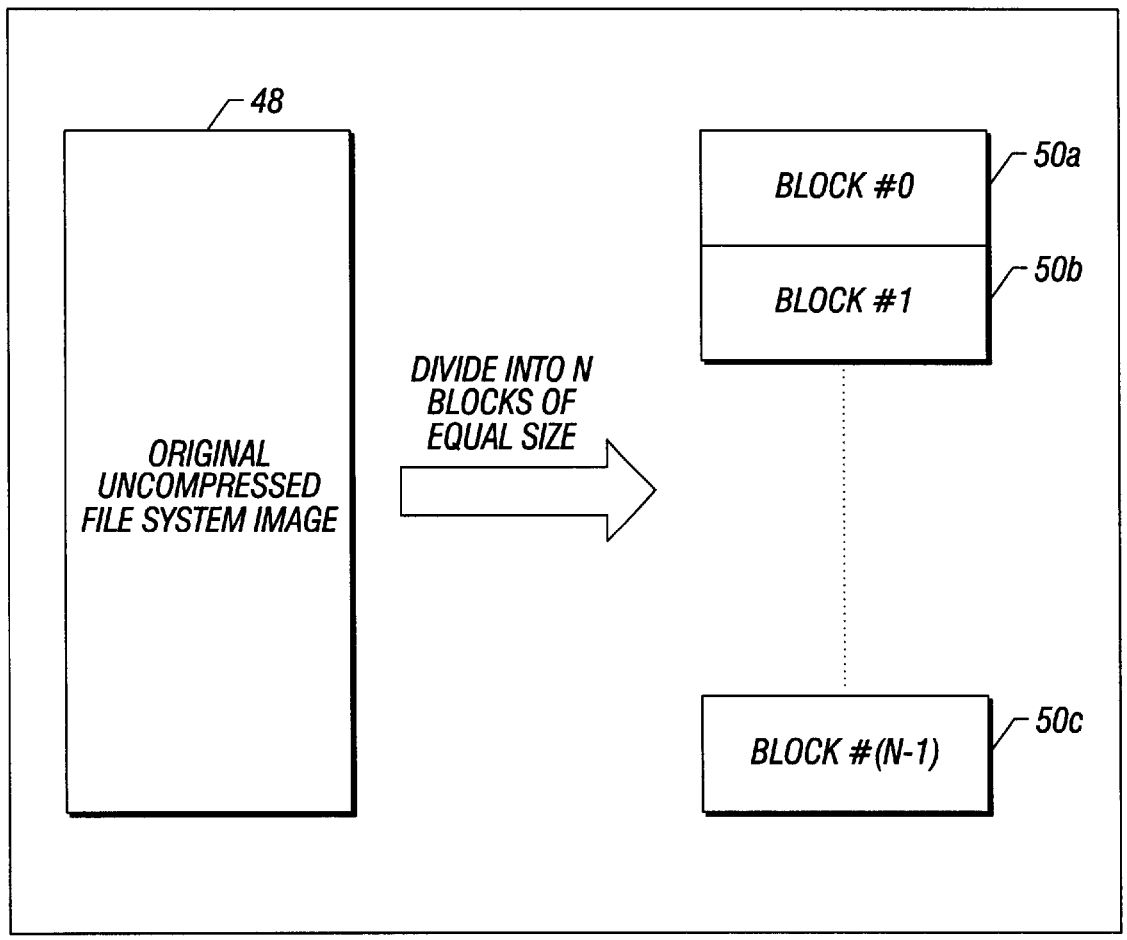
FIG. 2 is a schematic depiction of the division of original uncompressed files into blocks in accordance with one embodiment of the present invention.

A compressed file system image may be created initially by forming a single binary file which contains the original uncompressed file system data in its raw form as indicated at 48 in FIG. 2. The file containing the original uncompressed file system is then divided into a number of equally sized data blocks 50a–50c. The block size is the same for each compressed file system image and is set at build time in one embodiment of the invention.

Figure 3:
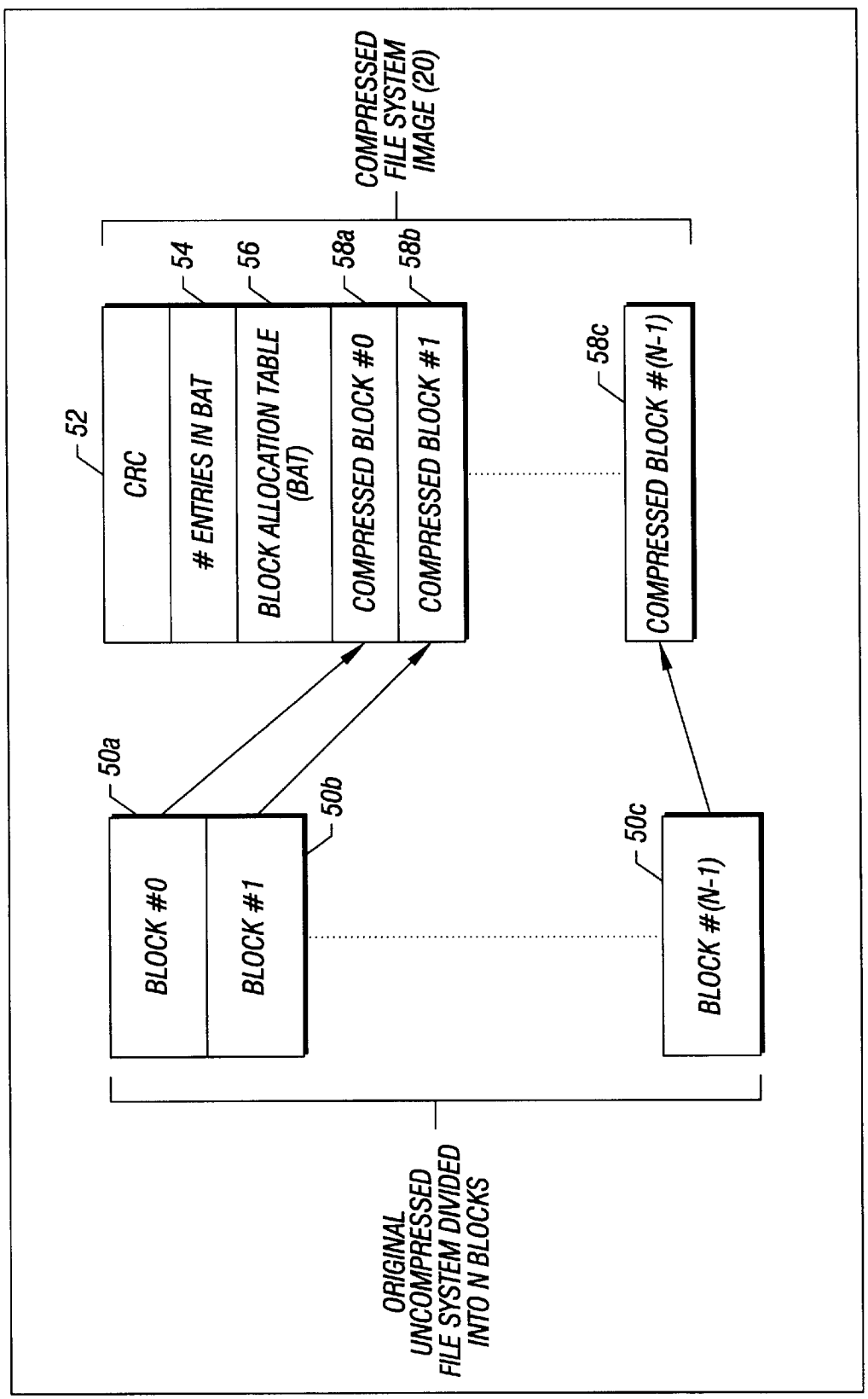
FIG. 3 is a schematic depiction of the allocation within a compressed file system image in accordance with one embodiment of the present invention.

The uncompressed data is then compressed into variable length blocks 58 of compressed data and concatenated together as indicated in FIG. 3. Thus, the uncompressed blocks 50a–50c are compressed to form compressed blocks 58a–58c of the compressed file system image 20.

Each of the areas 34, 36 and 38 (FIG. 1) includes an image having a header section (52–56) and a series of compressed blocks 58 which store the file system data, as shown in FIG. 3 in one embodiment of the invention. The header section of the compressed file system image includes a field 52 with cyclic recovery check information. This field may have a zero offset and a length of two bytes. The cyclic recovery check value is calculated over the length of a block allocation table. The header also includes a field 54 for the number of block allocation table entries. It has an offset of two and a length of four bytes. The number of entries in the block allocation table may be stored as an unsigned, long value. The actual block allocation table (BAT) 56 has an offset of six and a length which is equal to the number of bat entries. The BAT 56 describes starting offsets and lengths for each compressed block 58.

The device driver 18 uses the BAT 56 to find, in the semiconductor memory 40, the beginning and ending location of each of the compressed data blocks 58. The device driver 18 operates by decompressing the compressed blocks of data in real time and mapping the decompressed data into the file system as requested by the operating system kernel 12 at run time. The device driver 18 may have no knowledge of the file system stored as the compressed file system image 20.

Thus, in accordance with some embodiments of the present invention, an operating system may have access to compressed file system data stored on a semiconductor memory. Semiconductor memories may be less prone to electrical or mechanical failure than hard disk drives. In some embodiments of the present invention, the file system interfaces on the operating system may be utilized and leveraged by application level programs. Since the data stored in the semiconductor memory is compressed, less memory may be required, resulting in a less expensive solution.

Any file system can be stored in the semiconductor memory independently of the nature of kernel's file system. Thus, the device driver 18 may be unaware of the file system stored within the semiconductor memory 40. In some embodiments of the present invention, additional files may be accessed by the client system 10 from a remote server (not shown). The client may be a processor-based system such as a desktop computer system, a handheld computer system, a processor-based television system, a set-top box, an appliance, a thin client, a cellular telephone or the like. In some embodiments, the system 10 may not be a network connected system.

A storage device implementing the re-programmable semiconductor memory 40 may be electrically re-programmed. The storage device may also act as the BIOS memory for the client in one embodiment of the invention. While conventionally a BIOS memory is a read only memory (ROM), by using a re-programmable memory 40 the operating system as well as the BIOS may be updated or replaced when corrupted. In other embodiments of the present invention, a conventional BIOS ROM may be used in addition to the memory 40.

A variety of flash memories may implement the memory 40, such as Intel's StrataFlas™ brand memory. One advantageous memory is a 28F64OJ5 eight megabyte flash array available from Intel Corporation. This memory includes a plurality of one hundred twenty kilobyte blocks. Each block may be data protected so that it may not be erased or overwritten. In other words, data protection may be selectively applied to one or more of the plurality of blocks in the memory.

A variety of operating systems may be utilized for the kernel 12 including Linux, Microsoft Windows® 98, Windows 2000 or CE, and Be operating systems, as examples. The primary operating system may also be a real time operating system (RTOS) such as the Palm OS® Software 3.5 available from 3Com Corporation.

The recovery operating system 44 operates in cases where the primary operating system 42 is corrupted or needs updating. The recovery operating system 44 may be an operating system of reduced size which includes basic, essential functions and the limited software needed to obtain a new primary operating system. Thus, as used herein, a recovery operating system is an operating system that is responsible for updating and/or obtaining a replacement for a primary operating system.

Ideally, the recovery operating system 44 may be stripped down as much as possible to conserve memory. If possible, its kernel may be reduced to only that code which is necessary to implement its recovery and update functions. One kernel that is particularly applicable is a Linux kernel. The Linux kernel includes an X-based kernel utility called MakeXConfig. This utility provides a graphical user interface to facilitate selecting the elements of the kernel and the operating system. That is, the Linux operating system allows the user to answer a series of questions, posed through a graphical user interface, indicating whether particular functionalities are desired.

In the case of some system errors or crashes, the client system may reboot thereby resolving the error. If the number of reboots exceeds some threshold level, the recovery operating system may be invoked. When the system attempts to reboot, it may check a CMOS memory reboot count flag and then automatically reboot the recovery operating system if the reboot count threshold is exceeded. The recovery operating system 44 is started so that a new version of the primary operating system 42 may be fetched.

The allocation table (AT) 26 partitions the memory 40 and allows multiple code and data changes to be stored in the memory 40. This in turn allows multiple boot loaders to exist within the memory for booting different operating system images. At boot time, the BIOS 46 may select which boot loader to load and execute based on the status of a recovery bit.

A boot loader 28 for loading the primary operating system may be stored above the allocation table 26. Above the boot loader 28 is the kernel 30 or the core of the primary operating system 42. The primary operating system 42 may be the same or different than the recovery operating system 44.

Above the kernel 30 is the file system. The allocation table 26 includes one entry for each item stored in the memory 40 including the items stored in the file system. The file system includes files, directories and information used to locate and access operating system files and directories.

Each item contained in the allocation table 26 includes information about the software version, the flags, the data offsets, the length of the data and its load address. The version number may keep track of which version of software was loaded in a particular memory. The data offset determines where, in the memory 40, an entry is located. The flag field has information about the nature of the respective entries. The least significant bit of the flag field may include information about the status of the cyclic recovery check. This in effect tells the BIOS whether a CRC must be calculated. The next most significant bit includes the block type. The block type includes "boot" which indicates a boot loader, "kernel", or "file system". If the block type is boot loader, the flag field tells where, in random access memory, to load the boot loader out of the memory 40. A boot loader or boot strap loader loads and passes control to another loader program which loads an operating system.

Figure 4:
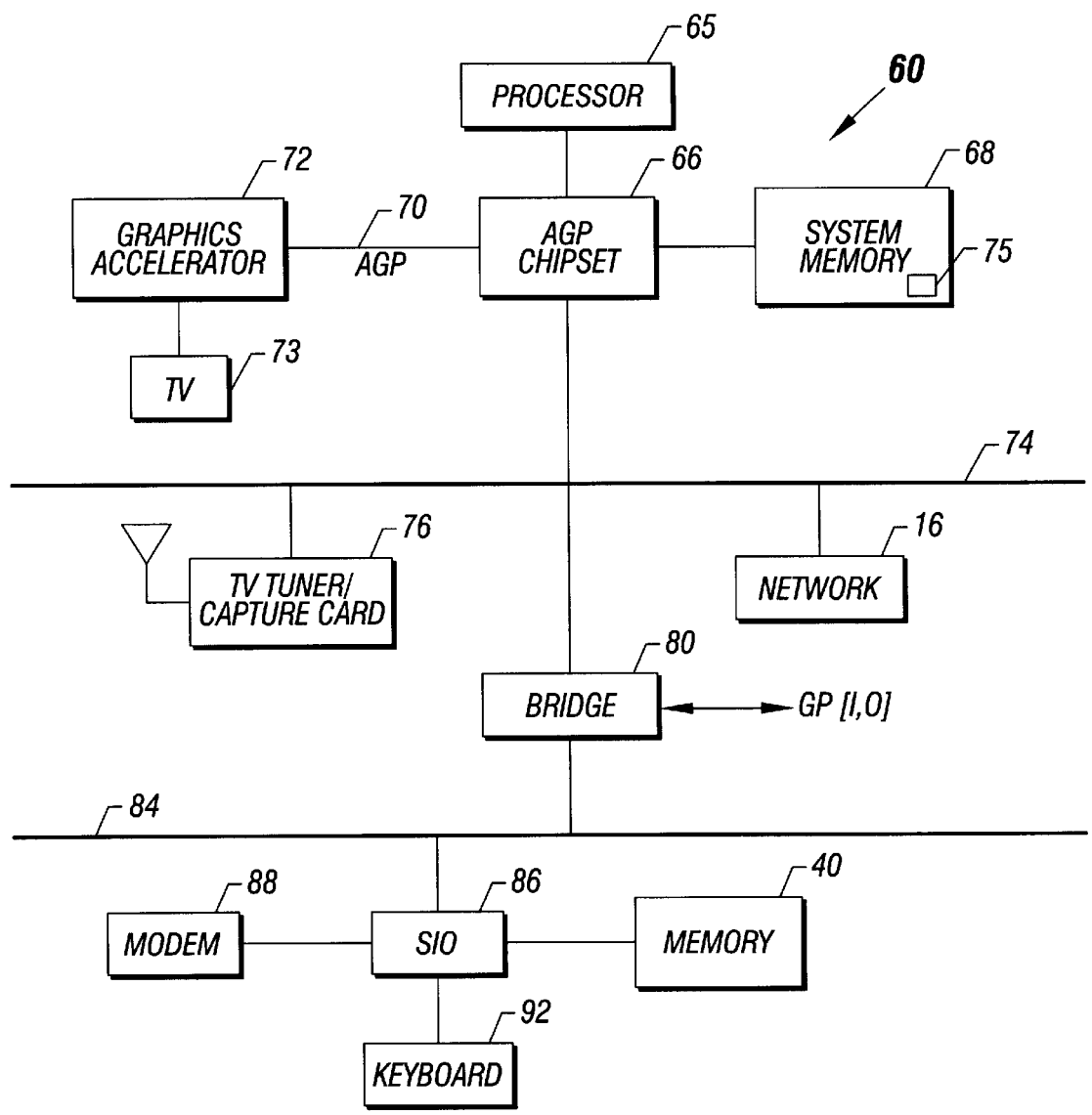
FIG. 4 is a block diagram of one system for implementing an embodiment of the present invention.

While the present invention may be used with a variety of processor-based systems, an application which uses a set-top box as the client system 60 is illustrated in FIG. 4. A set-top box works with a television receiver. The client 60 may include a processor 65 coupled to an accelerated graphics port (AGP) chipset 66. The Accelerated Graphic Port Specification, Rev. 2.0 is available from Intel Corporation, Santa Clara, Calif. The chipset 66 may be coupled to system memory 68 in the accelerated graphics port bus 70. The bus 70 in turn may be coupled to a graphics accelerator 72 also coupled to a video or television receiver 73.

A portion 75 of system memory, called the CMOS memory, may be implemented by memory in integrated circuit which is adapted to save system data. Conventionally, the CMOS includes a real time clock which keeps the time. Recovery and update bits are stored in the CMOS memory in predefined locations.

The chipset 66 may also be coupled to a bus 74 and receives a television tuner/capture card 76. The card 76 may be coupled to a television antenna 78 which also may be a satellite or cable connection as additional examples. An interface to a network 16 such as a modem interface connection to the Internet or a network interface controller to a computer network may also be provided.

A bridge 80 may in turn be coupled to another bus 84 which supports a serial input/output interface 86 and a memory interface 94. The interface 86 may be coupled to a modem 88 or a keyboard 92. The interface 94 may couple the memory 40 storing the recovery operating system, BIOS, and primary operating system. The bridge 80 may be the 82371ABPCI ISA IDE Xcelerator (PIIX4) chipset available from Intel Corporation. Thus, it may include a general purpose input/output pins (GP[I,O]).

With a number of chipsets used to implement computer systems, the chipset may be set up so that it only sees a certain number of lines of BIOS code at any one time. In embodiments in which the primary operating system and the recovery operating system are stored in flash memory, they may be accessed in the same way as BIOS memory is accessed. Thus, since the flash memory that is accessed is considerably larger than a BIOS memory, it may be desirable to allow other techniques to access all the data stored in the flash memory. One technique for doing this in processors from Intel Corporation is to use the GP[I,O] pins, for example, on the PIIX4 device. These pins can be coupled to the pins responsible for developing the signals for reading the BIOS. When providing the appropriate GP[I,O] signals, flash memory reading may be bank switched to sequentially read the entire memory.

The system 60 may create the compressed file system image for storage on the memory. For example, the system may boot from another storage device, create the file system image and store that image on the memory 40. Alternatively, the image may be created and stored on the memory 40 by an external processor-based system.

Figures 5, 6:
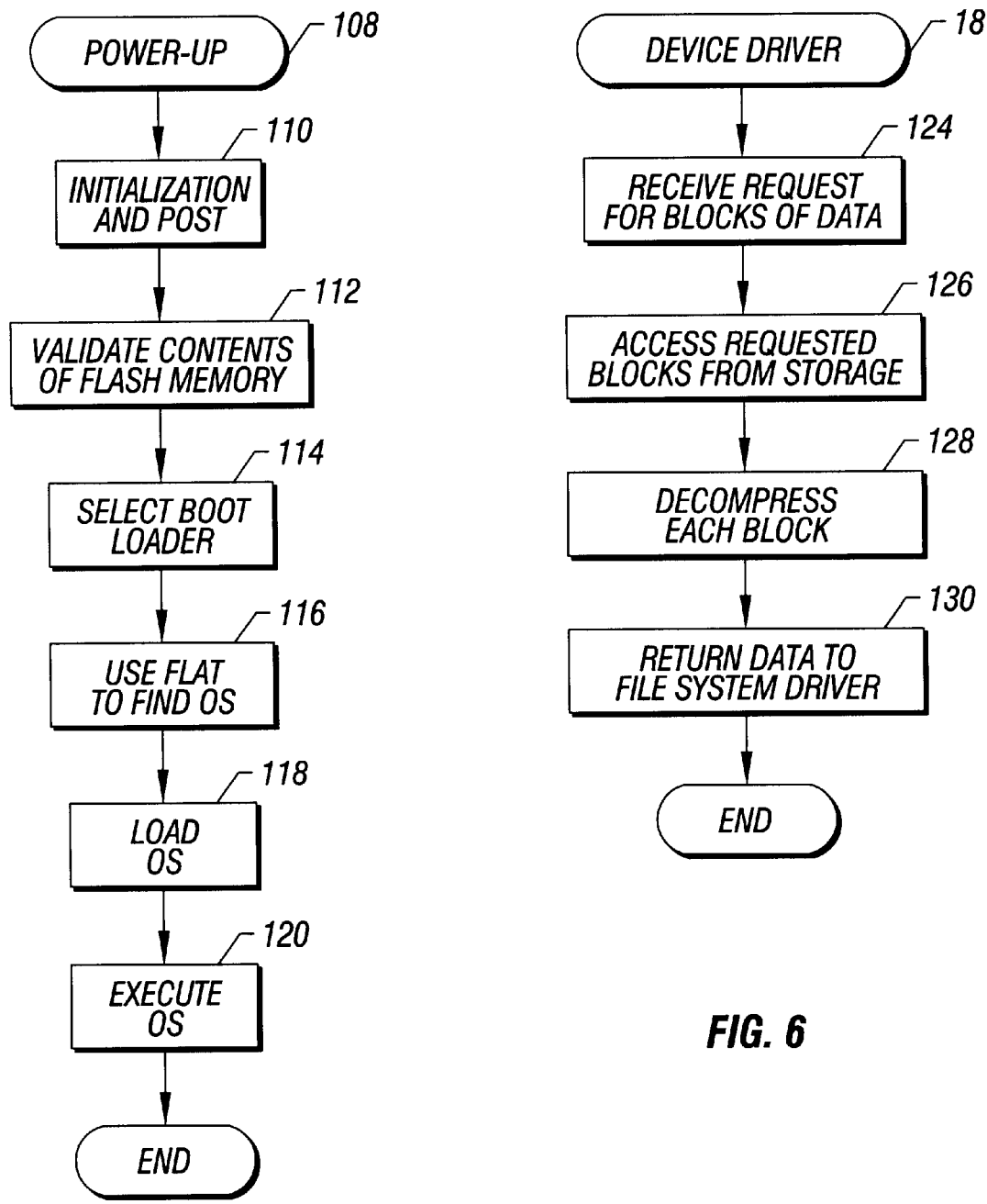
FIG. 5 is a flow chart for software which may be used in accordance with one embodiment of the present invention.
FIG. 6 is a flow chart for software that may be used in accordance with one embodiment of the invention.

Referring now to FIG. 5, in accordance with one embodiment, software 108 begins on power up or system reset with the BIOS executing and performing system initialization and power on self-test activities (block 110). The contents of the memory 40 may be validated by checking the CRC stored in field 96 in the flash memory, as indicated in block 112. At this point, the BIOS selects the boot loader (block 114) to execute by scanning the allocation table and selecting an entry marked as a boot loader. The boot loader then uses the allocation table to find where in the flash memory the primary operating system is located (block 116), loads the operating system at the appropriate address in system memory (block 118) and starts its execution (block 120).

Referring to FIG. 6, the device driver 18 may begin receiving a request for blocks of data as indicated in block 124. The requested blocks are accessed from the storage as indicated in block 126. Each block is decompressed and indicated in block 128. The data is then returned to the file system module as indicated in block 130.

Figure 7:
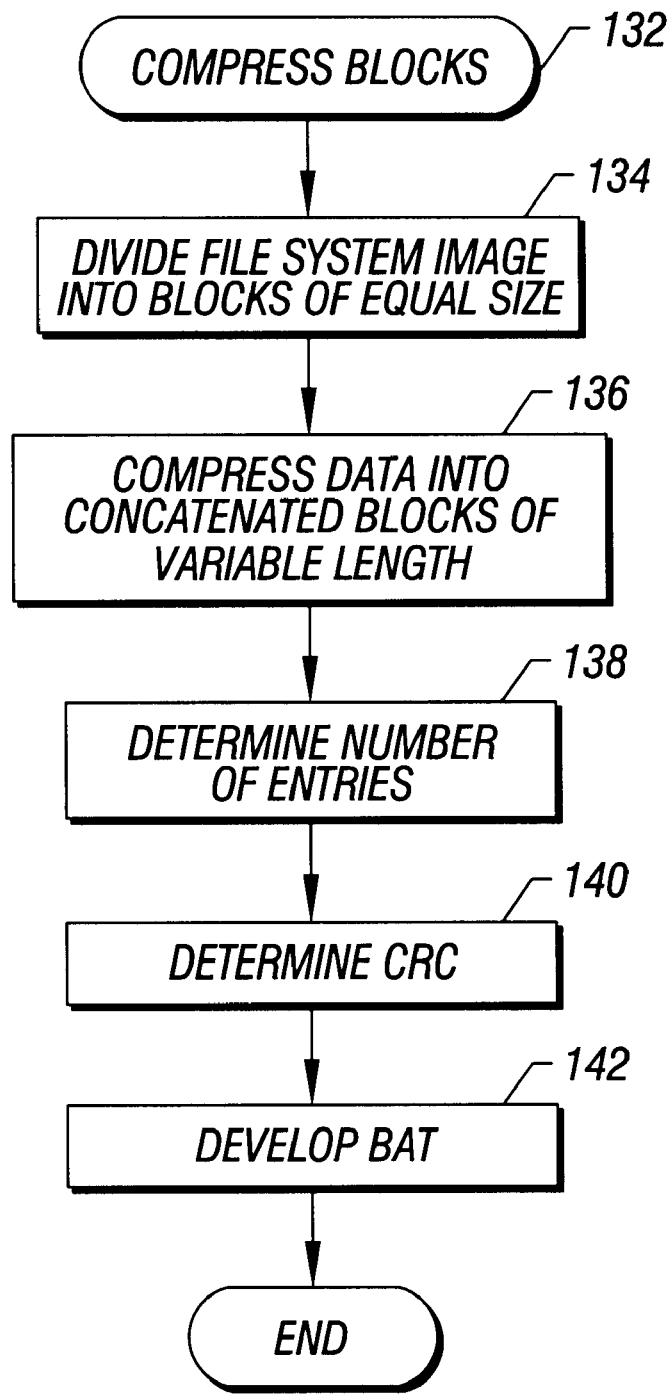
FIG. 7 is a flow chart for software for compressing the blocks of information in accordance with one embodiment of the present invention.

The software 132 for compressing the file system image, shown in FIG. 7, begins by dividing the file system image into blocks 50 of equal size as indicated at 134. The data is compressed and formed into blocks 50 that are of variable length and concatenated as indicated at 136. The number of entries is determined (block 138) as well as the CRC (block 140) and the BAT (block 142).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a request from an operating system for file data;
   accessing a semiconductor memory storing compressed file data; and
   locating said file data on said semiconductor memory using information stored in said semiconductor memory.

2. The method of claim 1 further including decompressing said compressed file data.

3. The method of claim 2 including using a device driver to format the decompressed data in a format compatible with a file system utilized by said operating system.

4. The method of claim 3 including storing the decompressed data in a buffer for use by a file system driver.

5. The method of claim 1 including forming a file system image of blocks of data of substantially equal size.

6. The method of claim 5 including compressing each of said blocks to form a compressed file system image formed of blocks of unequal size.

7. The method of claim 6 including affixing a header to said file system image which provides information about how to locate each block.

8. The method of claim 7 including providing in said header information about the number of entries in an allocation table and providing in said allocation table information about the length of each of said compressed blocks in said file system image.

9. The method of claim 1 including accessing an operating system stored in said semiconductor memory.

10. An article comprising a medium storing instructions that cause a processor-based system to:
    receive a request from an operating system for file data;
    access a semiconductor memory storing compressed file data; and
    locate said file data on said semiconductor memory using information stored in said semiconductor memory.

11. The article of claim 10 further storing instructions that cause a processor-based system to decompress said compressed file data.

12. The article of claim 11 further storing instructions that cause a processor-based system to use a device driver to format the de-compressed data in a format compatible with a file system utilized by said operating system.

13. The article of claim 12 further storing instructions that cause a processor-based system to store the de-compressed data in a buffer for use by a file system driver.

14. The article of claim 10 further storing instructions that cause a processor-based system to form a file system image of blocks of data of substantially equal size.

15. The article of claim 14 further storing instructions that cause a processor-based system to compress each of said blocks to form a compressed file system image formed of blocks of unequal size.

16. The article of claim 15 further storing instructions that cause a processor-based system to affix a header to said file system image which provides information about how to locate each block.

17. The article of claim 16 further storing instructions that cause a processor-based system to provide in a header a block allocation table including information about the length of each of said compressed blocks in said file system image.

18. The article of claim 17 further storing instructions that cause a processor-based system to provide in said header information about the number of entries in said allocation table.

19. The article of claim 17 further storing instructions that cause a processor-based system to access an operating system stored in said semiconductor memory.

20. A system comprising:
   a processor; and
   a re-programmable semiconductor memory coupled to said processor, said semiconductor memory to store a compressed operating system, compressed file data for said operating system, and compressed information for use in locating said file data in said semiconductor memory.

21. The system of claim 20 wherein said semiconductor memory is a flash memory.

22. The system of claim 21 including a basic input/output system stored in a compressed format on said semiconductor memory.

23. The system of claim 22 including, stored on said semiconductor memory, a primary operating system and a backup operating system for use when the primary operating system fails or needs updating.

24. The system of claim 20 including a device driver to decompress said compressed data in said semiconductor memory and to provide said data in a format used by the operating system.

25. The system of claim 24 including a file system driver to organize the data received from said device driver into a file system.

26. The system of claim 20 wherein said semiconductor memory stores an allocation table to indicate the length of entries stored in said semiconductor memory and the number of entries in said allocation table.

27. The system of claim 20 wherein said file data stored in compressed form on said semiconductor memory is formed into compressed blocks of unequal length.

28. The system of claim 27 including a loader and a kernel for an operating system stored on said semiconductor memory.

29. The system of claim 20 including data for more than one file system stored on said semiconductor memory.

30. The system of claim 20 including a network connection to download additional data from a network.

* * * * *

UNITED STATES PATENT AND TRADEMARK OFFICE
CERTIFICATE OF CORRECTION

PATENT NO. : 6,741,978 B1
DATED : May 25, 2001
INVENTOR(S) : Edward R. Rhoads and James P. Ketrenos It is certified that error appears in the above-identified patent and that said Letters Patent is hereby corrected as shown below:

Column 7,
Line 17, "claim 17" should be -- claim 10 --.

Signed and Sealed this

Twentieth Day of July, 2004

JON W. DUDAS
*Acting Director of the United States Patent and Trademark Office*